(12) United States Patent
Liu et al.

(10) Patent No.: US 11,729,481 B2
(45) Date of Patent: Aug. 15, 2023

(54) PROVIDING CUSTOMIZED ABRIDGED VERSIONS OF MEDIA ITEMS BASED ON AVAILABLE USER TIME

(71) Applicant: International Business Machines Corporation, Armonk, NY (US)

(72) Inventors: Su Liu, Austin, TX (US); Yang Liang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/504,564

(22) Filed: Oct. 19, 2021

(65) Prior Publication Data

US 2023/0117085 A1 Apr. 20, 2023

(51) Int. Cl.
*H04N 21/8549* (2011.01)
*H04N 21/45* (2011.01)
*H04N 21/442* (2011.01)
*H04N 21/845* (2011.01)

(52) U.S. Cl.
CPC ... *H04N 21/8549* (2013.01); *H04N 21/44213* (2013.01); *H04N 21/4532* (2013.01); *H04N 21/8456* (2013.01)

(58) Field of Classification Search
None
See application file for complete search history.

(56) References Cited

U.S. PATENT DOCUMENTS

| | | | | |
|---|---|---|---|---|
| 5,778,135 | A * | 7/1998 | Ottesen | H04N 7/17318 348/E7.071 |
| 2014/0099080 | A1* | 4/2014 | Cudak | H04N 21/44222 386/E5.028 |
| 2016/0014482 | A1* | 1/2016 | Chen | H04N 21/8456 386/241 |
| 2017/0134828 | A1* | 5/2017 | Krishnamurthy | H04N 21/47202 |
| 2017/0171623 | A1* | 6/2017 | Peterson | H04N 21/472 |
| 2017/0230694 | A1* | 8/2017 | Shaw | H04N 21/482 |
| 2018/0322300 | A1* | 11/2018 | Segal | G10L 15/08 |
| 2020/0382834 | A1* | 12/2020 | Gupta | H04N 21/8455 |
| 2020/0382841 | A1* | 12/2020 | Gupta | H04N 21/84 |

OTHER PUBLICATIONS

Anonymous, "International Journal of Learning,Teaching and Educational Research." /www.ijlter.org/index.php/ijlter. Sep. 27, 2021, 2 Pages.

(Continued)

*Primary Examiner* — Heather R Jones
(74) *Attorney, Agent, or Firm* — Cantor Colburn LLP; Teddi Maranzano (57) ABSTRACT

Embodiments of the invention are directed to providing custom abridged versions of a media item. Aspects include receiving, from an electronic device of a user, a request for the media item and dividing the media item into a plurality of segments. Aspects also include determining a length of an available time for the user and creating the abridged version of the media item by combining a subset of the plurality of segments, where the runtime of the abridged version of the media item is less than the length of available time. Aspects further include transmitting, to the electronic device of the user, the abridged version of the media item.

11 Claims, 5 Drawing Sheets

(56) References Cited

OTHER PUBLICATIONS

Bazarevsky et al. "Mobile Real-time Video Segmentation" https://ai.googleblog.com/2018/03/mobile-real-time-video-segmentation.html. Mar. 1, 2018. 7 Pages.

Bush, Michael et al., "Customized Video Playback: Standards for Content Description, Customization, and Personalization," Educational Technology 44, No. 4 (2004): 5-13.

Lai, Hung-Jen et al., "Customized Internet News Services Based on Customer Profiles," Proceedings of the 5th International Conference on Electronic Commerce, pp. 225-229, 2003.

tétard "Fragmentation of Working Time and Smarter Is-Solutions." Hawaii International Conference on System Sciences—2000. 10 Pages.

Tseng, Belle L. et al., "Video Personalization and Summarization System," 2002 IEEE Workshop on Multimedia Signal Processing, pp. 424-427.

\* cited by examiner

PROVIDING CUSTOMIZED ABRIDGED VERSIONS OF MEDIA ITEMS BASED ON AVAILABLE USER TIME

BACKGROUND

The present invention generally relates to providing abridged versions of media items, and more specifically, to providing customized abridged versions of media items based on available user time.

Often individuals opt to not watch media content items, such as a video because the length of the content item is longer than the amount of free time that the user has. For example, a user who has a twenty-minute bus ride may decide against watching a content item that has a run-time of twenty-five minutes. In these cases, a user may wish to watch an abridged version of the media item, which is a shortened version of the media item, i.e., it is not the original version because parts have been cut or omitted. However, abridged versions of media items are not always available.

SUMMARY

Embodiments of the present invention are directed to a computer-implemented method for providing customized abridged versions of media items based on available user time. A non-limiting example of the computer-implemented method includes receiving, from an electronic device of a user, a request for the media item and dividing the media item into a plurality of segments. The method also includes determining a length of an available time for the user and creating the abridged version of the media item by combining a subset of the plurality of segments, where the runtime of the abridged version of the media item is less than the length of available time. The method further includes transmitting, to the electronic device of the user, the abridged version of the media item.

Embodiments of the present invention are directed to a system for detecting changes to a firebreak line. A non-limiting example of the system includes a processor communicative coupled to a memory, the processor configured to providing customized abridged versions of media items based on available user time. The processor is also configured to receive, from an electronic device of a user, a request for the media item and divide the media item into a plurality of segments. The processor is also configured to determine a length of an available time for the user and create the abridged version of the media item by combining a subset of the plurality of segments, where the runtime of the abridged version of the media item is less than the length of available time. The processor is further configured to transmit, to the electronic device of the user, the abridged version of the media item.

Embodiments of the invention are directed to a computer program product for providing customized abridged versions of media items based on available user time, the computer program product comprising a computer readable storage medium having program instructions embodied therewith. The program instructions are executable by a processor to cause the processor to perform a method. A non-limiting example of the method includes receiving, from an electronic device of a user, a request for the media item and dividing the media item into a plurality of segments. The method also includes determining a length of an available time for the user and creating the abridged version of the media item by combining a subset of the plurality of segments, where the runtime of the abridged version of the media item is less than the length of available time. The method further includes transmitting, to the electronic device of the user, the abridged version of the media item.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order, or actions can be added, deleted, or modified. Also, the term "coupled" and variations thereof describes having a communications path between two elements and does not imply a direct connection between the elements with no intervening elements/connections between them. All of these variations are considered a part of the specification.

DETAILED DESCRIPTION

As discussed above, individuals often decide to not watch media content items, such as a video, because the length of the content item is longer than the free time available to the user. In these cases, a user may wish to view an abridged version of a media item, i.e., a shortened version of the content item, however, an abridged version of media items are not always available. In addition, if an abridged version of a media item is available, its length may be too short or too long for the user. For example, a user wishes to watch a movie that has a runtime of two hours during a flight that is ninety minutes long. If there is an abridged version available that has a runtime of ninety-five minutes, it will still be too long for the user to watch. Likewise, if there is an abridged version available that has a runtime of sixty minutes, it will still be too short for the user to watch because the user believes that they will miss too much of the movie.

Exemplary embodiments include methods, systems, and computer program products for creating and providing a customized abridged version of a media item based on available user time. In exemplary embodiments, upon receiving a request for a media item from a user, the length of time available to the user is determined and the media item is divided into a plurality of segments. Based on the length of time available, an abridged version of the media item is created by combining a subset of the plurality of segments. The abridged version of the media item is then transmitted to an electronic device of the user.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
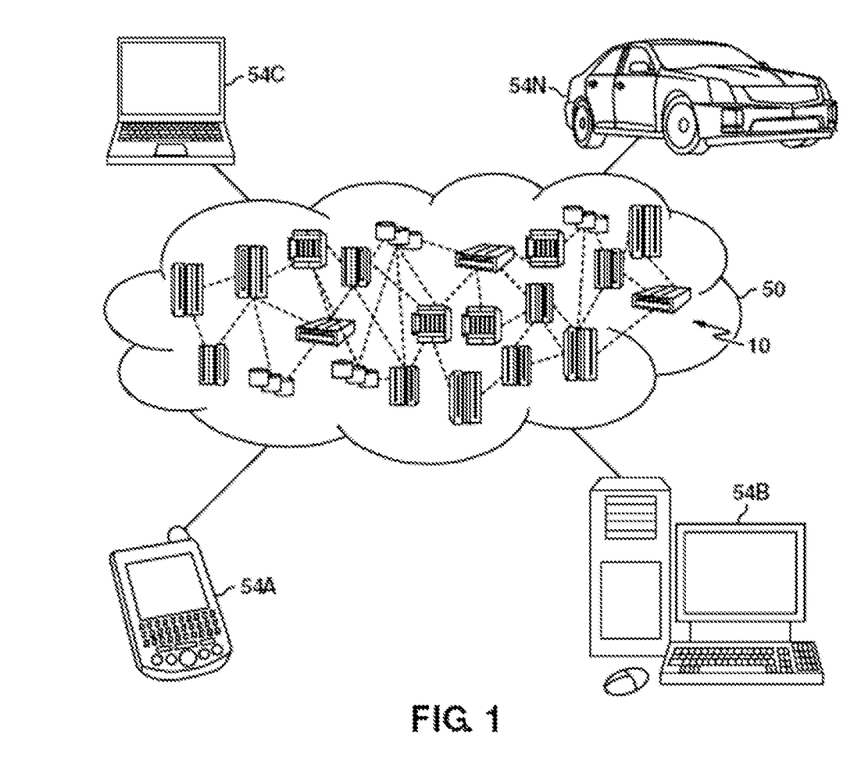
FIG. 1 depicts a cloud computing environment according to one or more embodiments of the present invention.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
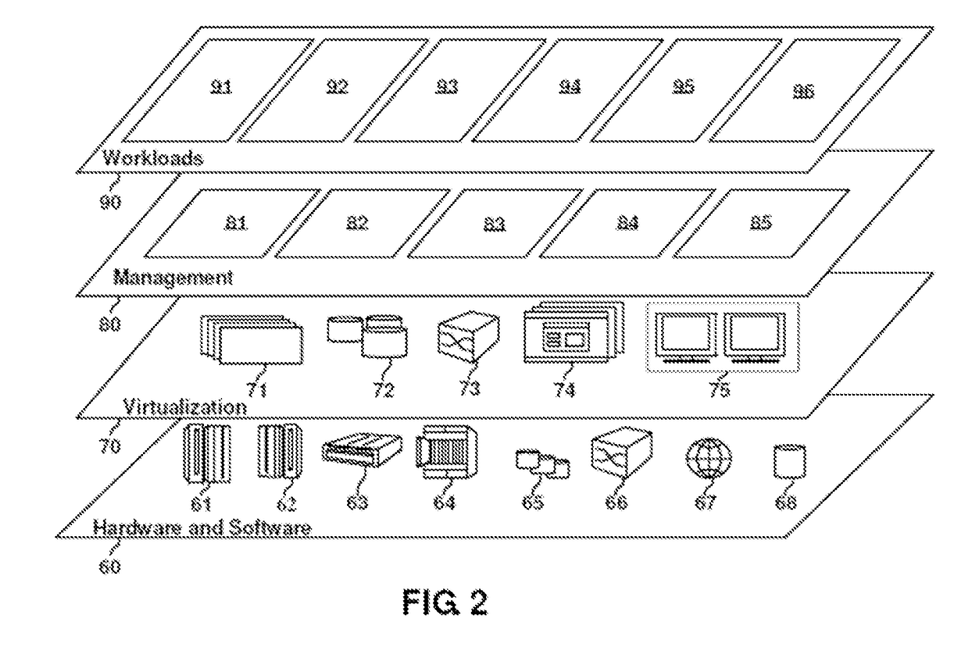
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and creating a customized abridged version of a media item based on available user time 96.

Figure 3:
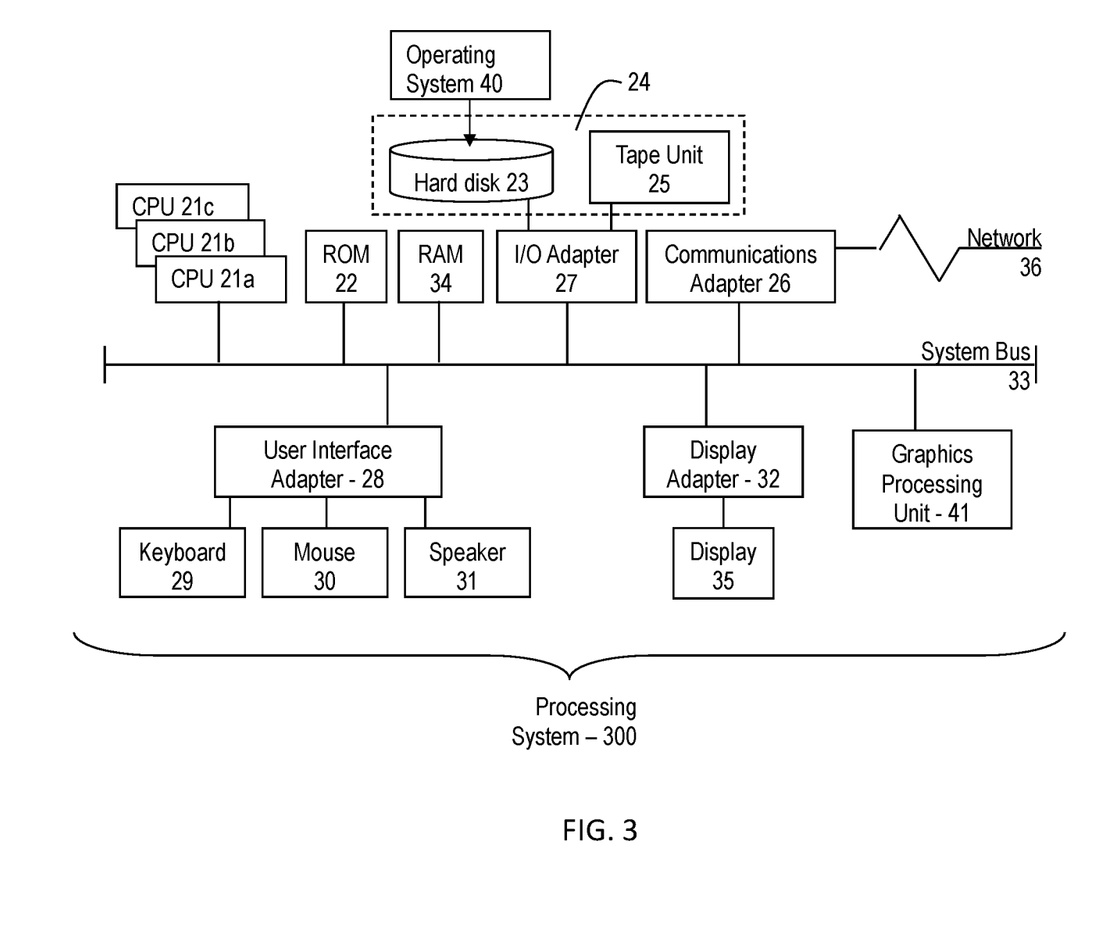
FIG. 3 depicts a block diagram of a computer system for use in implementing one or more embodiments of the present invention.

Referring to FIG. 3, there is shown an embodiment of a processing system 300 for implementing the teachings herein. In this embodiment, the system 300 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 300.

FIG. 3 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 300 may be stored in mass storage 24. A network adapter 26 interconnects bus 33 with an outside network 36 enabling data processing system 300 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 300 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 3, the system 300 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system to coordinate the functions of the various components shown in FIG. 3.

Turning now to a more detailed description of aspects of the present invention, methods, systems, and computer program products for creating and providing customized abridged versions of media items based on available user time are provided. In exemplary embodiments, upon receiving a request for a media item from a user, the length of time available to the user is determined and the media item is divided into a plurality of segments. Based on the length of time available, an abridged version of the media item is created by combining a subset of the plurality of segments. The abridged version of the media item is then transmitted to an electronic device of the user.

In exemplary embodiments, an activity of a user is tracked and analyzed to identify periods of user free time and to estimate the anticipated length of the periods of user free time. In one embodiment, the user's free time is one of a time spent commuting, lunchtime, a break time, or any other time where a user is expected to be available to consume a content item. The user free time is determined using a historical fragmented time analysis which analyzes a fragmented time pattern of the user based on tracked user daily activities. The tracked user daily activities are obtained from various sources that include, but are not limited to, a calendar of the user, a usage and location history of smartphone of a user, a usage history of a computer of the user, and user location information obtained sensors within one or more internet-of-things (IoT) devices associated with the user.

Figure 4:
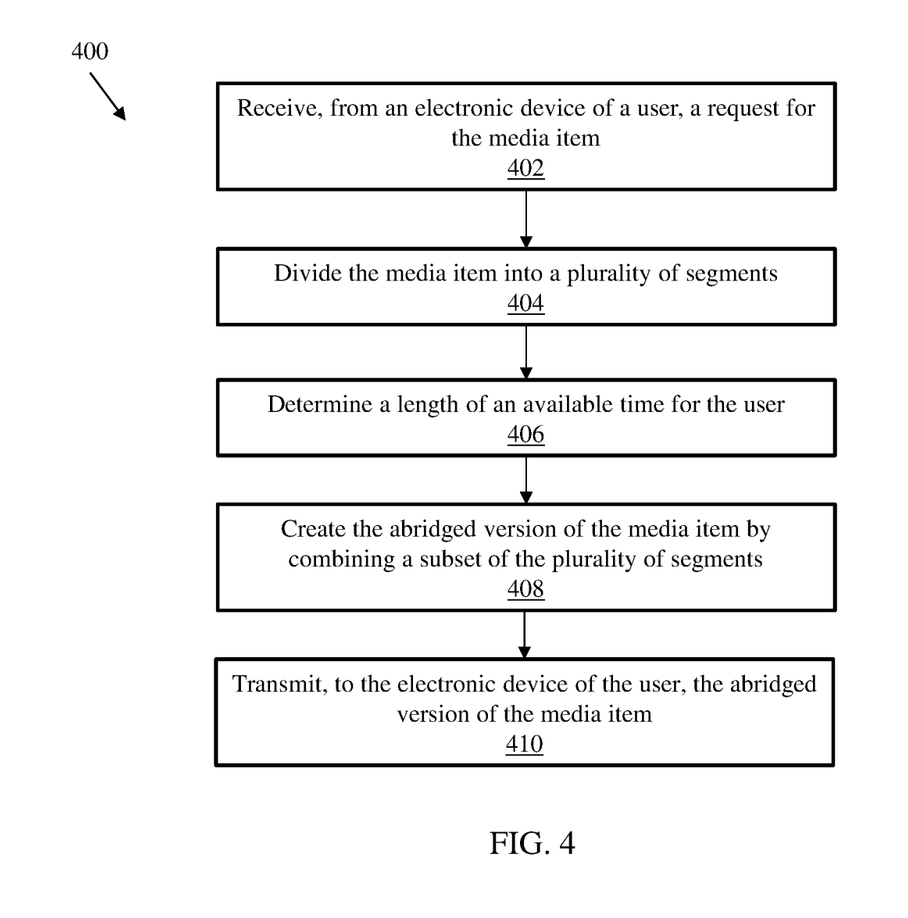
FIG. 4 depicts a flow diagram of a method for providing customized abridged versions of media items based on available user time according to one or more embodiments of the invention.

Referring now to FIG. 4 a flow diagram of a method 400 for providing an abridged version of a media item according to one or more embodiments of the invention is shown. As illustrated at block 402, the method 400 includes receiving, from an electronic device of a user, a request for the media item. Next, as shown at block 404, the method 400 includes dividing the media item into a plurality of segments. In exemplary embodiments, each of the plurality of segments has a minimum length, i.e., one, two, five minutes, etc. In addition, the length of all of the plurality of segments are not equal to one another, i.e., a first segment is three minutes long and a second segment is three minutes and thirty seconds long. In exemplary embodiments, the media item is divided into the plurality of segments based on one or more of the content of the media item and one or more characteristics of the user. In one embodiment, the media item is divided into the plurality of segments based on an analysis of the media item to identify different scenes, portions relating to different topics, periods with/without dialogue, and the like. In one embodiment, the media item is divided into the plurality of segments based on one or more characteristics of the user. In exemplary embodiments, the one or more characteristics of the user include age of the user, a current location of the user, a home location of a user, an education level of a user, a gender of the user, a skill level of a user in an area related to the media item, and the like.

Continuing with reference to FIG. 4, the method 400 also includes determining a length of an available time for the user, as shown at block 406. In one embodiment, the user directly provides the length of an available time for the user when making the request for the media item. In another embodiment, the length of an available time for the user is obtained from an available time predictor, which is configured to predict periods of available time of a user based on historical fragmented time analysis. In one embodiment, the historical fragmented time analysis includes obtaining and analyzing fragmented time patterns of the user based on tracked user daily activities. The tracked user's daily activities are obtained from various electronic devices that are associated with the user, such as a smartphone, personal computer, and IoT devices.

Once the length of available time is determined, the method 400 proceeds to block 408 and creates the abridged version of the media item by combining a subset of the plurality of segments. The subset of the plurality of segments are selected to ensure that the runtime of the abridged version of the media item is less than the length of available time. In exemplary embodiments, the subset of the plurality of segments are selected from the plurality of segments based on one or more of a content of the media item, one or more characteristics of the user, one or more preferences of the user, and on the length of the available time for the user. In exemplary embodiments, the one or more characteristics of the user include age of the user, a current location of the user, a home location of a user, an education level of a user, a gender of the user, a skill level of a user in an area related to the media item, and the like.

In exemplary embodiments, the one or more preferences of the user include a user's like or dislike of action sequences, romantic scenes, and the like in media item. The one or more preferences can also include a user's like or dislike of repetitive content, level of detail in explanation, and of introductory or background material in the media item. For example, if the media item is an educational video, the user's preferences can specify if the user prefers whether the abridged version of the media item includes repetitive examples, a higher level or lower level of detailed explanation of the topic, and an introductory material. In one embodiment, the one or more user preferences are provided by the user. In another embodiment, the one or more user preferences of the user are obtained by applying a machine-learning algorithm to a media item viewing history of the user. Once the abridged version of the media item is created, the method 400 proceeds to block 410 and transmits, to the electronic device of the user, the abridged version of the media item.

Figure 5:
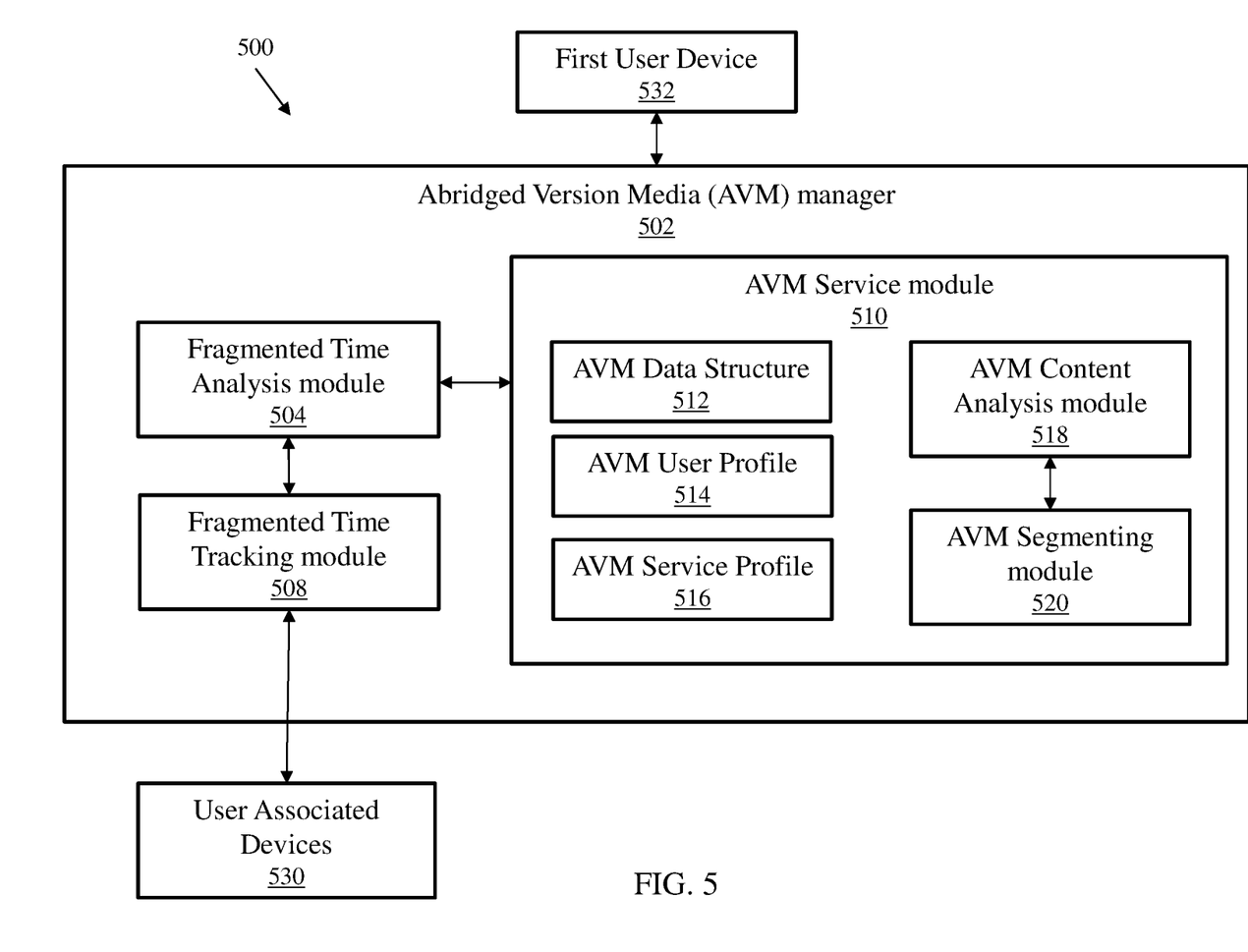
FIG. 5 depicts a block diagram of a system for providing customized abridged versions of media items based on available user time according to one or more embodiments of the invention.

Referring now to FIG. 5 a block diagram of system 500 for providing an abridged version of a media (AVM) according to one or more embodiments of the invention is shown. The system 500 includes an abridged version of a media (AVM) manager 502, a first user device 532, and one or more user associated devices 530. In one embodiment, the AVM manager 502 is embodied in a processing system such as the one shown in FIG. 3. In another embodiment, the AVM manager 502 is embodied in one or more cloud computing nodes such as the one shown in FIG. 1. As illustrated the AVM manager 502 includes an AVM service module 510 that is configured to define and manage an AVM Data Structure 512, an AVM User Profile 514, and an AVM Service Profile 516.

The AVM Data Structure 512 is configured to save data for each AVM item created and the characteristics used to create each AVM item. In one embodiment, the AVM Data Structure 512 includes the following data, a user identification a selected media identification, a suggested available time for the user, an abridgement policy for the media item, an original segmented list, and a selected segment list. The AVM User Profile 514 is a file for saving user characteristics and user preferences for creating and consuming AVM. In exemplary embodiments, users are able to create and edit their personal characteristics and preferences in the AVM User Profile 514. The AVM Service Profile 516 is a configuration file for saving AVM policies and related configurations, which are related to the media item.

In addition, the AVM service module 510 includes an AVM Content Analysis module 518 that is configured to analyze a user requested original media (un-abridged version) and to obtain one or more policies of an owner of the media item. The AVM service module 510 also includes an AVM segmenting module 520 that is configured to divide a user-requested original media (un-abridged version) into segments that have a minimum size. In exemplary embodiments, the minimum size, the length of each segment, and the number of segments is determined based on one or more policies of the owner of the media item and the characteristics and preferences of the user. The AVM segmenting module 520 is further configured to create an abridged version of the media item by selecting the segments of the original media to combine. The segments are selected based on the analysis of the media item, the characteristics, and preferences of the user, and based on a predicted available time of the user. The predicted available time of the user is received by the AVM service module 510 from a fragmented time analysis module 504.

The AVM manager 502 also includes a fragmented time analysis module 504 that is configured to analyze fragments available free time for a user and to predict an amount of free time that a user has to watch a media item. The fragmented time analysis module 504 obtains the user free time data from a fragmented time tracking module 508 which is configured to track a user's daily activities and fragmented free time by monitoring user activity on a plurality of user associated devices 530. The user associated devices 530 include a smartphone, a computer, a smartwatch, and the like of the user. In one embodiment, the plurality of user associated devices 530 include one or more internet-of-things (IoT) devices that include sensors that can monitor the location and activity of the user. Data regarding the user's daily activities can be obtained from a calendar of the user, location data for the user, phone usage data of the user, chat history of the data, as well as historical daily activity of the user obtained from IoT sensors. The IoT sensors can include sensors for collecting correlated daily information, such as smart devices, RFID readers, motion detectors, infrared sensors, WIFI routers, access points, global positioning system, laser scanner, and other information sensing equipment.

In one example, the fragmented time tracking module 508 obtains data that indicates that a user typically leaves their office at 5:00 PM and arrives home at 6:30 PM. This data could be based on the Wi-Fi networks the user's smartphone was connected to, based on a location service on the user's smartphone, or based on data from IoT sensors in the user's office and the user's home. In this example, the fragmented time analysis module 504 determines that the user has a predicted available afternoon commute time of 90 minutes.

In exemplary embodiments, the AVM manager 502 receives a request for an abridged version of a media item, such as a video or audio recording, from a first user device 532. The request includes an identification of both the user and the requested media item. In one embodiment, the request includes a user provided available free time that the user has for consuming the media item. In other embodiments, the AVM 502 determines a length of an available time for the user based on a fragmented time analysis. In response to the request, the AVM 502 obtains an original version of the requested media item, divides it into a plurality of segments, and creates an abridged version of the media item that has a running time that is less than the available time for the user. The abridged version of the media item is then transmitted from the AVM manager 502 back to the first user device 532.

Technical benefits of creating and providing custom abridged version of a media (AVM) items in response to a user request include a reduction in storage space in servers that store media items as multiple abridged version of the media items will no longer need to be stored. In addition, the system for creating and providing custom abridged version of a media (AVM) items will increase the ability of content producers to reach a broader audience by allowing consumers to watch custom abridged versions based on their preferences and characteristics.

Additional processes may also be included. It should be understood that the processes depicted in FIG. 4 represent illustrations and that other processes may be added, or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method of providing an abridged version of a media item, the method comprising:
   receiving, from an electronic device of a user, a request for the media item;
   dividing the media item into a plurality of segments, wherein the media item is divided into the plurality of segments based on one or more characteristics of the user and one or more preference of the user, wherein the one or more characteristics of the user include a skill level of a user in an area related to the media item;
   determining a length of an available time for the user, wherein determining the length of the available time for the user further comprises identifying a predicted time that the user will be available based on tracked user daily activities obtained via internet-of-things (IoT) sensors disposed in a home of the user that monitor an activity of the user, the IoT sensors comprising at least one of a RFID reader, a motion detector, and a WIFI router;
   creating the abridged version of the media item by combining a subset of the plurality of segments, wherein a runtime of the abridged version of the media item is less than the length of available time; and
   transmitting, to the electronic device of the user, the abridged version of the media item,
   wherein the one or more preferences of the user are provided by the user and include the user's desire for inclusion of introductory material and repetitive examples in the media item.

2. The computer-implemented method of claim 1, wherein determining the length of the available time for the user comprises analyzing fragmented time patterns for the user based on tracked user daily activities.

3. The computer-implemented method of claim 2, wherein the tracked user daily activities are obtained from one or more electronic device associated with the user.

4. The computer-implemented method of claim 1, wherein the subset of the plurality of segments are selected from the plurality of segments based on one or more of a content of the media item, one or more characteristics of the user, one or more preferences of the user, and on the length of an available time for the user.

5. A system comprising:
a processor communicatively coupled to a memory, the processor configured to:
receive, from an electronic device of a user, a request for the media item;
divide the media item into a plurality of segments, wherein the media item is divided into the plurality of segments based on one or more characteristics of the user and one or more preference of the user, wherein the one or more characteristics of the user include a skill level of a user in an area related to the media item;
determine a length of an available time for the user, wherein determining the length of the available time for the user further comprises identifying a predicted time that the user will be available based on based on tracked user daily activities obtained via internet-of-things (IoT) sensors disposed in a home of the user that monitor an activity of the user, the IoT sensors comprising at least one of a RFID reader, a motion detector, and a WIFI router;
create the abridged version of the media item by combining a subset of the plurality of segments, wherein a runtime of the abridged version of the media item is less than the length of available time; and
transmit, to the electronic device of the user, the abridged version of the media item,
wherein the one or more preferences of the user are provided by the user and include the user's desire for inclusion of introductory material and repetitive examples in the media item.

6. The system of claim 5, wherein determining the length of the available time for the user comprises analyzing fragmented time patterns for the user based on tracked user daily activities.

7. The system of claim 6, wherein the tracked user daily activities are obtained from one or more electronic device associated with the user.

8. The system of claim 5, wherein the subset of the plurality of segments are selected from the plurality of segments based on one or more of a content of the media item, one or more characteristics of the user, one or more preferences of the user, and on the length of an available time for the user.

9. A computer program product for providing an abridged version of a media item comprising a computer readable storage medium having program instructions embodied therewith, the program instructions executable by a processor to cause the processor to perform a method comprising:
receiving, from an electronic device of a user, a request for the media item;
dividing the media item into a plurality of segments, wherein the media item is divided into the plurality of segments based on one or more characteristics of the user and one or more preference of the user, wherein the one or more characteristics of the user include a skill level of a user in an area related to the media item;
determining a length of an available time for the user, wherein determining the length of the available time for the user further comprises identifying a predicted time that the user will be available based on based on tracked user daily activities obtained via internet-of-things (IoT) sensors disposed in a home of the user that monitor an activity of the user, the IoT sensors comprising at least one of a RFID reader, a motion detector, and a WIFI router;
creating the abridged version of the media item by combining a subset of the plurality of segments, wherein a runtime of the abridged version of the media item is less than the length of available time; and
transmitting, to the electronic device of the user, the abridged version of the media item,
wherein the one or more preferences of the user are provided by the user and include the user's desire for inclusion of introductory material and repetitive examples in the media item.

10. The computer program product of claim 9, wherein determining the length of the available time for the user comprises analyzing fragmented time patterns for the user based on tracked user daily activities.

11. The computer program product of claim 10, wherein the tracked user daily activities are obtained from one or more electronic device associated with the user.

* * * * *